United States Patent [19]

LaPointe et al.

[11] Patent Number: 5,019,977
[45] Date of Patent: May 28, 1991

[54] LIGHT PEN INTERACTIVE WEATHER PARAMETER DISPLAY SYSTEM

[75] Inventors: Daniel J. LaPointe, Bar Harbor; Michael Vietti, Atlantic; John S. Baer, Bar Harbor, all of Me.

[73] Assignee: RainWise, Inc., Bar Harbor, Me.

[21] Appl. No.: 268,802

[22] Filed: Nov. 7, 1988

[51] Int. Cl.$^5$ .......................... G06F 15/54; G01W 1/04
[52] U.S. Cl. ................................. 364/420; 73/170 R
[58] Field of Search ................ 364/420, 521; 340/707; 73/170 R

[56] References Cited

U.S. PATENT DOCUMENTS

| | | | |
|---|---|---|---|
| 3,909,818 | 9/1975 | Dalke et al. | 364/518 |
| 3,943,762 | 3/1976 | Baer | 73/171 |
| 4,068,847 | 1/1978 | Lukkarila et al. | 273/85 R |
| 4,079,450 | 3/1978 | Grimm et al. | 364/200 |
| 4,095,791 | 6/1978 | Smith et al. | 273/85 G |
| 4,163,326 | 8/1979 | Edwards | 33/361 |
| 4,190,833 | 2/1980 | Bejting et al. | 340/707 |
| 4,193,119 | 3/1980 | Arase et al. | 364/900 |
| 4,238,792 | 12/1980 | Cohen et al. | 340/707 |
| 4,271,409 | 6/1981 | Filliman | 340/703 |
| 4,287,762 | 9/1981 | Baer | 73/170 R |
| 4,431,870 | 2/1984 | May et al. | 179/81 C |
| 4,570,217 | 2/1986 | Allen et al. | 364/188 |
| 4,627,277 | 12/1986 | Baer | 73/170 R |
| 4,639,881 | 1/1987 | Zingher | 364/521 |
| 4,667,514 | 5/1987 | Baer | 73/386 |
| 4,803,412 | 2/1989 | Burton | 318/567 |
| 4,805,089 | 2/1979 | Lane et al. | 364/188 |
| 4,849,744 | 7/1989 | Putrow et al. | 340/721 |
| 4,853,693 | 8/1989 | Eaton-Williams | 340/588 |

FOREIGN PATENT DOCUMENTS

| | | | |
|---|---|---|---|
| 2535492 | 5/1984 | France | 364/420 |
| 0006328 | 9/1982 | Japan . | |
| 0085122 | 5/1983 | Japan . | |

OTHER PUBLICATIONS

PC Weather Pro 1.2 software program description, TMI Inc., Lake Oswego, Or., Apr. 1987.
Rutty, P. "Computer-Monitored Weather Station", Electronic Systems News (UK), Spring 1988, 22–25.
Sparks, L. et al., "Micros in Control-Online Weather Data Acquisition Using a BBC Microcomputer", Weather (GB), vol. 39, No. 7, Jul. 1984, 212–218.
Graham, R. C. et al., "Automated Data Acquisition from a Heath Weather Station", Intelligent Instruments & Computers, vol. 4, No. 4, Jul./Aug. 1986, 184–95,98.
Technology Marketing Inc., PC Weather Pro (a computer-controlled home weather station), Radio-Electronics, vol. 59, No. 3, Mar. 1988, 23–25,42.
Ciarcia, S., "Build a Computerized Weather Station", BYTE, vol. 7, No. 2, Feb. 1982, 38–68.
The Weather Channel, Trademarkscan ™ printout, Cable TV Arlington channel guide.

*Primary Examiner*—Clark A. Jablon
*Attorney, Agent, or Firm*—Daniel H. Kane

[57] ABSTRACT

A weather station display system displays weather data on a video monitor, TV receiver or other raster screen display. The weather data is derived from a weather station having multiple weather parameter sensors or transducers for measuring weather parameters and generating electrical signals representative of the measured values of the weather parameters. The electrical signals are conditioned and converted to digitally coded weather data. A microprocessor periodically samples and stores the digitally coded weather data and transfers weather data to a screen memory for raster scanning onto a raster screen display. The microprocessor also loads screen display format data including a main screen display format to the screen memory from program and screen data memory. A light pen coupled to the raster controller permits interrogation of character locations for selectively modifying displayed weather data. The program components stored in program memory direct updating weather data, user interactive light pen recall of maximum and minimum weather data, and interactive assembly of user messages.

21 Claims, 10 Drawing Sheets

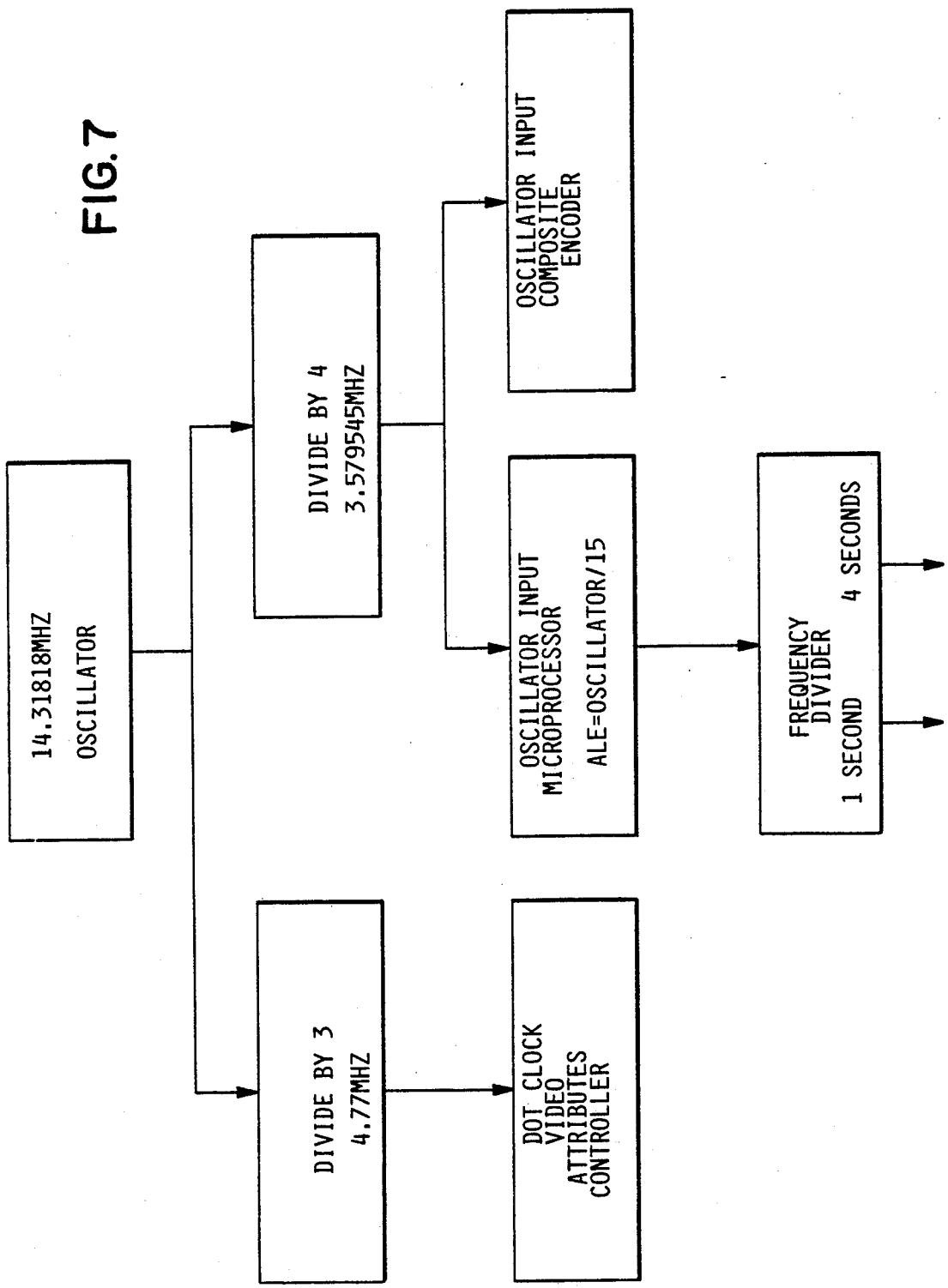

LIGHT PEN INTERACTIVE WEATHER PARAMETER DISPLAY SYSTEM

TECHNICAL FIELD

This invention relates to a new weather station display system for displaying weather data on a raster screen display such as a video screen or TV monitor. The weather data is derived from a weather station or weather center having a variety of weather parameter sensors or transducers for measuring weather parameters and generating electrical signals representative of the measurement values.

BACKGROUND ART

U.S. Pat. No. 4,287,762 describes a digital electronic weather station, weather center or weather monitor with a digital display panel and circuitry for selecting and displaying on the panel any of a number of monitored weather functions. The weather parameters include, for example, temperature, barometric pressure, humidity, wind speed, wind direction, and rainfall. Calculated weather parameters such as wind chill and degree days may also be included. The weather parameters are monitored by various ambient condition sensing transducers coupled to the weather station circuitry. These transducers provide measurement values in the form of electrical analog or digital signals for further processing. The weather parameter measurement signals are processed and stored and weather data is then displayed in the form of characters on the weather station panel. The weather station panel may be located on a wall, desk, or other accessible location.

The weather parameter transducers described in U.S. Pat. No. 4,287,762 generally utilize the rotational motion or other displacement of a respective parameter responsive structure and incorporate visible calibration marks for example in digital code pattern to be read by a stationary optical reader or photo detector which provides electrical output signals for processing. The optical reading techniques used in U.S. Pat. No. 4,287,762 generally transform analog devices typically employing as the moveable analog element a rotatable shaft, into digital readout devices.

U.S. Pat. No. 4,667,514 also describes a variety of parameter sensors and monitors useful as weather transducers for measuring weather parameters. The weather parameter sensors and monitors utilize a magnet element and a linear Hall Effect Transducer (HET) mounted for relative displacement with respect to each other for example on a weather parameter responsive structure and stationary housing. The displacement transducer assemblies utilizing HETs for measuring weather parameters provide electrical signal outputs suitable for analog or digital processing. A digital rain gauge providing digital output signals representing cumulative rain fall is described in U.S. Pat. No. 3,943,762.

In the basic weather station described in U.S. Pat. No. 4,287,762 a memory and microprocessor permit selection and display from memory of maximum and minimum readings of the monitored weather parameters and selection of additional calculated functions such as wind chill and degree days. A system clock permits display of time and date. User selection of weather parameters for display of measurement value weather data is made from among the multiple weather parameter functions by a rotary switch having a rotary dial with detente positions for selecting a particular transducer and associated circuitry and display elements. Conventional push button switches may also be used for selecting functions for display and for selecting maximum and minimum measurement values of a particular weather parameter for display along with the time and date of occurrence of the maximum or minimum value. Additional switches are provided for resetting data for storage and display.

A variation of the weather station display panel is described in U.S. Pat. No. 4,627,277 where a magnetic switch or selector is used for selecting from multiple weather functions being monitored. The display panel provides digital alphanumeric display of a monitored parameter or condition selected among multiple functions by a sliding magnet element which selectively actuates reed switches. User interaction for selection of maximum and minimum measurement values and for resetting stored weather data is also accomplished with the sliding magnet element switches. Each type of weather station display requires a specially manufactured display panel for presenting the selected weather data.

OBJECTS OF THE INVENTION

It is an object of the present invention to provide a new weather station display system which utilizes existing television receivers and video monitors for selectively displaying multiple weather parameters and conditions monitored by the transducers of a multi-function weather station.

Another object of the invention is to provide an interactive weather station display which the user may interrogate with a light pen for selecting weather data for display and for modifying stored weather data. For example the invention provides storage of maximum and minimum weather parameter measurement values over a specified time interval which may be selected by light pen interrogation for display.

A further object of the invention is to provide a multipage weather station weather parameter screen display format for flexible interaction including user assembly of user messages for incorporation in the weather screen display format.

DISCLOSURE OF THE INVENTION

In order to accomplish these results the present invention provides a weather station display system for displaying on a raster screen display, weather data from a weather station having a plurality of weather parameter or condition sensors. Each weather parameter or condition sensor is a transducer for generating electrical signals representative of the measurement values of the weather parameter condition. Electrical converting circuitry such as an analog to digital convertor is provided for converting the electrical signals representative of weather parameter measurement values to standard or uniform digitally coded weather data for digital signal processing.

The weather station display system incorporates a computer processor such as a microprocessor with microprocessor data memory for digital signal processing and storage of the digitally coded weather data. A screen memory provides a current screen memory for storing the current screen display information including screen display format data and digitally coded weather data for raster scanning from the screen memory onto a raster screen display. A raster controller or video controller coupled to the computer processor and screen memory controls and times access for updating the screen memory and for refresh of a raster screen display.

According to the invention a program and screen date memory referred to herein simply as the program memory, provided for example by an EPROM, holds the screen display format data and is operatively coupled to the computer processor for loading the screen display format data to the screen memory and video controller for initializing the screen display format. The screen display format data includes at least a main screen display format establishing an arrangement of multiple weather parameter character locations for weather data to appear in the form of characters on a raster screen display. A light pen is coupled to the raster controller for interrogating character locations of the screen display format on a raster screen display such as a TV monitor or video screen for selectively modifying the displayed weather data.

A first program component stored in the program memory causes the computer processor to sample periodically the digitally coded weather data from the respective weather parameter sensors and to update the weather data stored in the screen memory for display on a raster screen display. A second program component stored in the program memory causes the computer processor to respond to light pen interrogation of character locations of the screen display format on a raster screen display for selectively modifying the displayed weather data.

The weather station accompanying the display system may include weather parameter sensors for measuring for example temperature, barometric pressure and wind direction. Additional weather parameter sensors may be used for measuring humidity, wind speed, and cumulative rain fall. Additional weather functions may be calculated from the measured weather parameters such as wind chill and degree days. The weather station microprocessor and program components keep track of selected maximum and minimum measurement values over specified time intervals for interrogation and display as hereafter described.

The weather parameter sensors such as the temperature, humidity and barometric pressure transducers may generate electrical analog measurement signals for input to the electrical signal converter or analog to digital converter for converting the electrical analog signals to digitally coded weather data. Other weather parameter sensors such as the wind speed and wind direction sensors may use transducers which generate directly digitally coded electrical signals representative of the measurement values for input directly to the computer processor.

The main screen display format delineated by the screen display format data stored in the program memory includes a compass rose for displaying wind direction weather data by indicating wind direction for example by highlighting or bright illumination on the compass rose. Character locations inside the compass rose are reserved for displaying wind speed weather data. The main screen display format additionally includes character locations for displaying temperature, barometric pressure and humidity weather data in the form of alphanumeric characters. Additional character locations may be provided in the main screen display format for example for displaying rainfall and wind chill weather data in the form of alphanumeric characters.

In the preferred embodiment the weather station display system includes a character generator operatively coupled to the screen memory for generating alphanumeric characters for incorporation in the screen display format according to the current codes stored in the screen memory. Thus, the digitally coded weather data stored in the screen memory is converted to alphanumeric characters for display through the character generator.

The screen display format data stored in the program memory includes screen parameter data specifying the number of characters per line and the number of rows and columns of characters. When the weather station display system is actuated, this screen parameter data is loaded to the raster controller or video controller while other screen display format data from the program and screen data memory and the current digitally coded weather data from the microprocessor data memory are loaded in the current screen memory for initializing the screen display. The raster controller controls the scanning rate of "bit map" data from the screen memory for raster scanning onto a raster screen display and further controls timing of access to the "bit map" screen memory for updating and creating images.

The layout of the main screen display format includes character locations for indicating time and date in the form of alphanumeric characters. The system clock provides the real time data for indicating current time and date in the main screen display format and for timing signals.

According to the invention the main screen display format is arranged with maximum and minimum measurement value interrogation locations. The second program memory component causes the computer processor to respond to light pen interrogation of one of the maximum and minimum interrogation locations followed by light pen sensing of a selected weather parameter character location. The computer processor then recalls the respective maximum or minimum measurement value measured during a previous time interval to be written in the "bit map" screen memory and displayed on the raster screen display. A feature and advantage of the system clock, program components, and main screen display format is that the time and date of occurrence of the selected respective maximum or minimum measurement value is also displayed.

In the preferred embodiment the screen display format data stored in the program memory also includes a secondary screen display format presenting a table of alphanumeric characters for sensing or interrogation by the light pen to assemble messages of alphanumeric characters. The main screen display format includes a character message location while a third program component stored in program memory causes the computer processor to respond to light pen sensing of a sequence of alphanumeric characters from the table of the secondary screen display format for assembling and displaying a message at the character message location on the main screen display format. The respective main and secondary screen display formats include page selection locations for interrogation by the light pen to select and change between the main or secondary screen display format for display on a raster screen display.

The main screen display format generated by the screen display format data stored in program memory also includes reset locations for activation with the light pen for resetting selected weather data, for example resetting the maximum or minimum valves stored for weather parameters, or for resetting other selected parameters displayed on the main screen display format.

The video section of the weather station display system converts the raster screen display output to an analog composite video signal for direct input and display on a video monitor or for modulation on a standard TV channel carrier for input through the antenna of a standard NTSC color television. Other objects, features and advantages of the invention are apparent in the following specification and accompanying drawings.

BRIEF DESCRIPTION OF THE DRAWINGS

FIG. 7 is a block diagram of the system clock for the computerized weather station display system.

DESCRIPTION OF PREFERRED EXAMPLE EMBODIMENTS AND BEST MODE OF THE INVENTION

Figure 1:
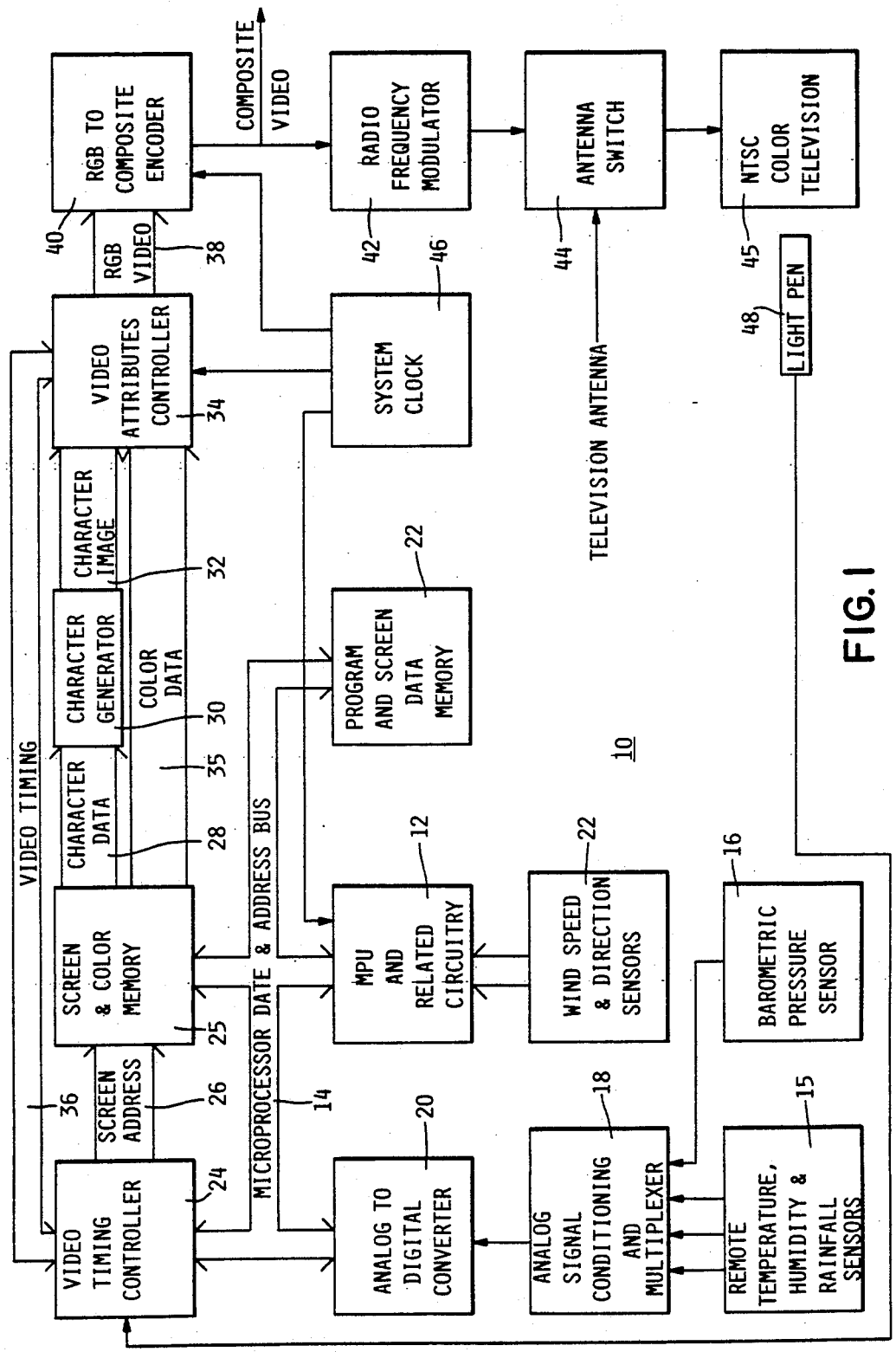
FIG. 1 is a block diagram of the weather station display system for interactive display of weather data on a TV monitor or other raster screen display.

In the general block diagram of the weather station display system 10 illustrated in FIG. 1 a digital computer microprocessor 12 mediates digital processing of weather data and transfer of data over the microprocessor data and address bus 14. Some of the weather data is received from remote analog electrical signal output transducer devices such as remote temperature, humidity and rainfall sensors 15 and barometric pressure sensor 16. Such analog signals pass through the analog signal conditioner and multiplexer 18 and analog to digital converter 20 which provides digitally coded weather data signals for input to the microprocessor 12. Other weather data may be derived from digital electrical signal output transducer devices such as wind speed and wind direction sensors 22 which provide digital signals for direct input to microprocessor 12.

The weather parameter sensors and transducer devices may be of the type for example described in U.S. Pat. No. 4,287,762 for a "Digital Weather Station" and U.S. Pat. No. 4,667,514 for "Parameter Sensors And Monitors". A "Digital Rain Gauge" is described in U.S. Pat. No. 3,943,762. A digitally coded output absolute rotational position indicator useful for example for indicating wind direction is described in applicant's co-pending U.S. patent application Ser. No. 166,971 filed on 03/11/88 for a "Rotational Position Indicator", now U.S. Pat. No. 4,888,986 issued Dec. 26, 1989. It is apparent that a variety of weather parameter transducer devices may be used with the present invention providing either analog or digital electrical output signals.

By way of additional examples, humidity weather data can be generated by a capacitive relative humidity sensor using a humidity dependent variable capacitor such as a MEPCO (TM) capacitor. The humidity dependent variable capacitor is incorporated in a pulse width modulation circuit generating an output pulse width proportional to humidity. Such circuits are available for example from Heathkit Model 1D2295 and from North American Phillips Corporation. By way of another example, a temperature sensor can be provided using a temperature dependent diode incorporated in a forward biased diode circuit generating a variable DC signal output proportional to temperature. A digital output wind speed sensor can be provided by a photo interrupter mounted on an anemometer. An optical encoder reader delivers a digital pulse output proportional in counts per second to wind velocity. A variety of such weather transducer devices and sensors is available from RainWise, Inc., Federal Street, Bar Harbor, Me. 04609.

The analog to digital convertor circuit 20 by way of example provides a range of $2^s$ possible states or 256 steps of resolution. Each step of resolution represents a digital increment of 10 millivolts (mv). The A/D converter therefore handles digital conversion of electrical analog signals over a voltage range from 0 to 2.56 volts with each 10 mv increment represented by a different combination of 8 digital bits. The digitally coded weather data output from A/D converter is input to the common bus 14 controlled by microprocessor 12.

The main screen display format data which sets up the arrangement of the various weather parameter alphanumeric character locations for display on a video screen or similar raster display is stored in the program and screen data memory 22 also referred to here and more simply as the program memory or program memory means 22. The screen display format data includes data for both a main screen display format with an arrangement of a multiple weather parameter character locations for display, and a secondary screen display format with a table of alphanumeric characters for assembling user messages and for other purposes all as hereafter described. The screen display format data particularly in the case of the main display screen format may include in addition to alphanumeric characters, graphic characters for the inclusion of graphic elements in the main screen display format, and color data.

The screen display format data also includes the basic screen parameter data defining the number of active characters per line or row and the number of active character rows making up the screen display format. Screen parameter data is also stored in program memory. The screen parameter data determines the number of scan lines per character row, equalization constants, and timing signals required by the video timing controller 24 also referred to herein as the raster controller 24. The program and screen data memory 22 or simply the program memory 22 is a permanent memory such as an EPROM with a latch and controller chips for permanent storage of the screen display format data. The raster controller 24 is for example, a Signetics (TM) 2672 single chip.

The microprocessor 12 includes active memory RAMS for storing digital weather data received from the weather parameter sensors. By way of example an update time of 4 seconds is used. The microprocessor checks the system clock 46 every 4 seconds and every 4 seconds takes the measurements from the respective weather parameter sensors. The current measurement for each weather parameter is stored in a register for updating the bit map memory. The measurement value is also compared with the maximum and/or minimum values for that weather parameter stored in memory and the maximum or minimum value is updated as may be required by comparison with the current measurement. The digitally coded weather data output from the A/D converter is in hexidecimal code and the microprocessor converts all weather data to binary coded decimal "BCD" digits for further processing and storage in the bit map memory as hereafter described.

When the weather station display system is turned on or activated the main screen display format data is transferred by the microprocessor from program memory 22 to the bit map memory or screen and color memory 25. The video controller controls access to the screen memory 25 over screen address bus 26 in accordance with the screen parameter data. The microprocessor also transfers current measurement value weather data to the appropriate weather parameter character locations of the bit map screen memory 25 where the data for the main screen display format including data establishing the weather parameter character locations has been transferred. The bit map screen memory 25 is provided by a bank of RAMS and battery backup may be used to maintain the active memory of the screen memory 25 and microprocessor 12 during power off or power out.

The screen display format data, initially the data for the main screen display format, along with the current measurement value weather data for the various weather parameters are actually stored in the screen memory or bit map memory 25 in the form of character codes. During scanning access of the screen memory 25 by video controller 24 for refresh of a raster screen display, these character codes are read out in a stream over the character data bus 28 to a character generator 30 which generates the full digital stream for the actual alphanumeric and graphic characters. The character generator is an EPROM plus latch. This character image digital data stream passes over the character image bus 32 to the video attributes controller 34 which may be, for example, a Signetics (TM) 2675 single chip.

Each of the character codes stored in the screen memory or bit memory 25 includes color code data which simultaneously passes over the color data bus 35 to the video attributes controller 34. The video attributes controller 34 receives video timing signals over the video timing bus 36 from raster controller 24, the character and graphics image data from the character image data bus 32, and the corresponding color data over color data bus 35, and combines color data with the character and graphics image data in an RGB video signal over RGB bus 38. The RGB video output from the video attributes controller 34 consists of the three digital data color image signals for red, green and blue (RGB) and the composite sync signal. The RGB to composite encoder 40 combines, multiplexes and converts the red, green and blue digital data color image signals and composite sync signal to form a single composite video analog output signal information for driving a video monitor.

Alternatively, the composite video signal containing all of the main screen display format information in analog video signal form may then be modulated on a conventional television channel carrier by radio frequency modulator 42. For example, the weather station display system main screen format display video signal is modulated onto the Channel 2 television carrier at 55.25 mhz or the Channel 3 television carrier at 61.25 mhz for input to the television antenna through an antenna switch 44 so that the weather station display system main screen display format appears on the color television screen 45. It is contemplated that the invention in the example format illustrated in FIG. 1 is used with either NTSC standard televisions or televisions which include a video monitor input. Other raster scanned displays may be used with appropriate modifications.

By way of example the screen parameters for the main screen display format are defined with characters having a size of $8 \times 8$ bits or $8 \times 8$ pixels per character. The screen is composed of rows containing approximately 26 characters across with 16 rows of characters from the top to the bottom of the screen. With the standard television raster scanning such as, for example 263 non-interlaced lines per 1/60th second over the screen in the vertical direction and 208 bits or pixels horizontally across the screen, the pixel resolution of the screen is approximately $208 \times 263$. The character generator is programmed to deliver the $8 \times 8$ bit or $8 \times 8$ pixel character information in a digital stream in response to the character codes stored in the screen memory 24.

The block diagram of the general system configuration of FIG. 1 may be viewed as composed of several sections. The input section or portion consists of the weather parameter sensors 15, 16, and 22, electrical signal processing components 18 and 20 for the outputs from the analog weather parameter sensors 15 and 16, the microprocessor 22, and the overall system clock 46. The input section is found in the basic RainWise (TM) weather station available from RainWise Inc., Federal Street, Bar Harbor, Me. 04609. The program section includes the program and screen data memory 22 containing programmatic screen display format data and screen parameter data. Interactive programmatic data components are also contained in the program section for user interaction with the screen display formats using light pen 48. The video section includes the raster controller 24, "bit map" screen memory 25, character generator 30, video attributes controller 34 and RGB to composite encoder 40. The video section provides the weather station display system screen display format in the form of a standard composite video signal. The output section includes the modulator 42 and related components for modulating the video signal onto a standard television carrier and for input to the appropriate channel of the NTSC or standard color television 45.

Completing the major components of the interactive weather station display system is the light pen 48 which enables user interaction with both the elements of the main screen display format and the elements of the secondary screen display format as hereafter described. Output from the light pen 48 is read by video timing controller or raster controller 24 for incorporating light pen interrogation information in the addressing of the screen memory 25 for updating the bit map.

Figure 2:
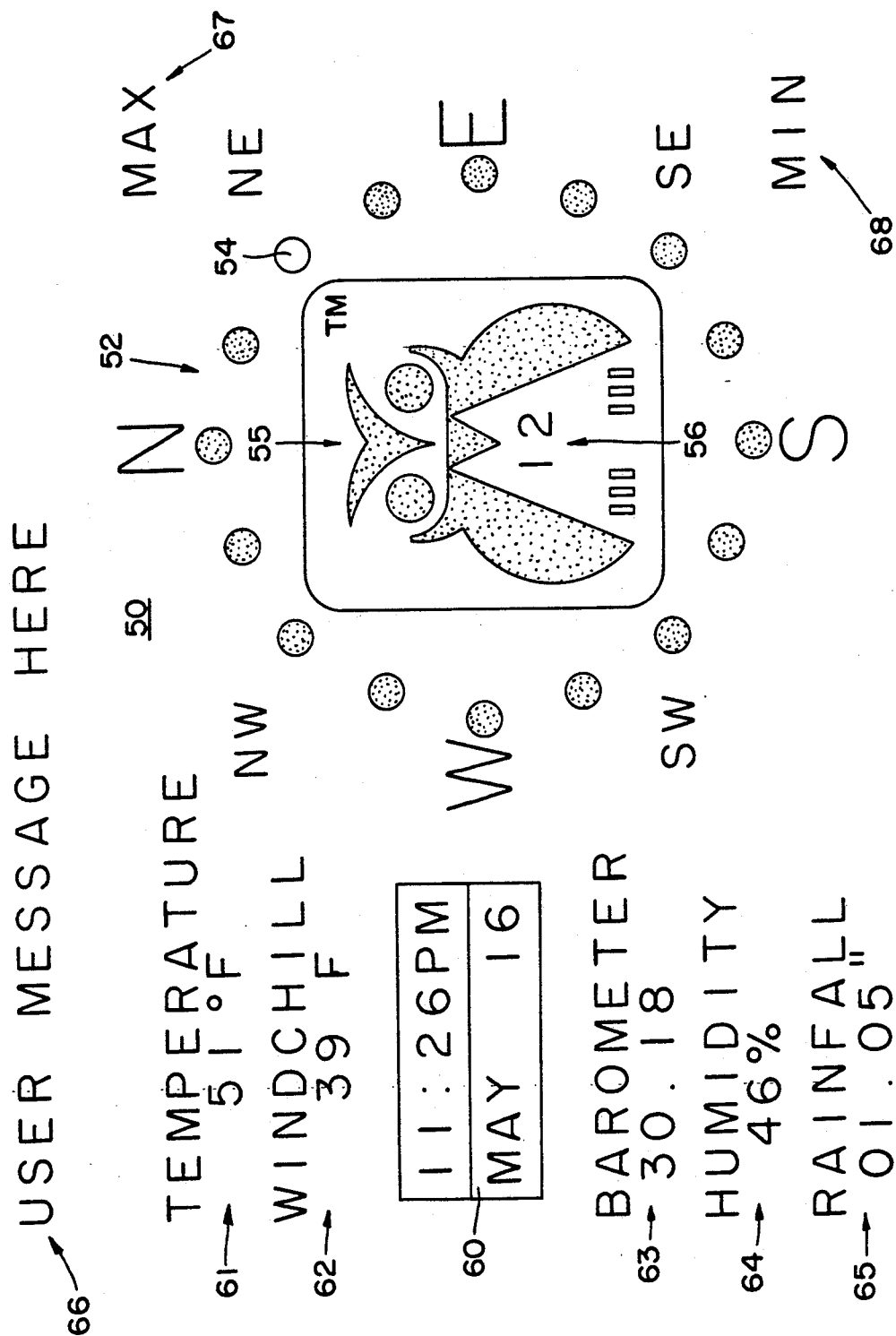
FIG. 2 is a diagrammatic view of the main screen display format displaying the weather data for weather parameters at character locations on the main screen display.

The basic main screen display format established by the screen display format data stored in the program memory is illustrated in FIG. 2. The main screen display format 50 includes as a prominent feature the compass rose 52 for indicating wind direction according to the position and compass bearing of the lighted spot or indicator 54. The light indicator 54 may be differentiated from the other points of the compass rose by for example level of illumination or color. In this example light spot 54 indicates wind originating from the Northeast (NE). The screen display format data for the main screen display format establishes all of the alphanumeric and graphic character locations for all of the points and directions of the compass rose.

Positioned within the compass rose 52 is a graphic symbol 55. In this example the graphic symbol 55 is the RainWise Owl Design, the trademark symbol or logo of RainWise, Inc., assignee of the present patent application. The graphic symbol 55 incorporated within the compass rose 52 includes a wind speed character location 56 for display of the current wind speed, in this example 12 miles per hour.

To the left of compass rose 52 an alphanumeric character location box 60 is provided for display of current date and time, in this example 11:26 A.M. on May 16. Above and below the date and time character location box 60 are 5 weather parameter display alphanumeric character locations 61, 62, 63, 64 and 65 for display of current temperature, wind chill, barometer, humidity and rainfall readings or measurements. At the top of the main screen display format 50 is a user message alphanumeric character location 66 for display of a user message assembled from alphanumeric characters displayed in the secondary screen display format and assembled by user light pen interaction with the secondary screen display format as hereafter described.

Figure 3:
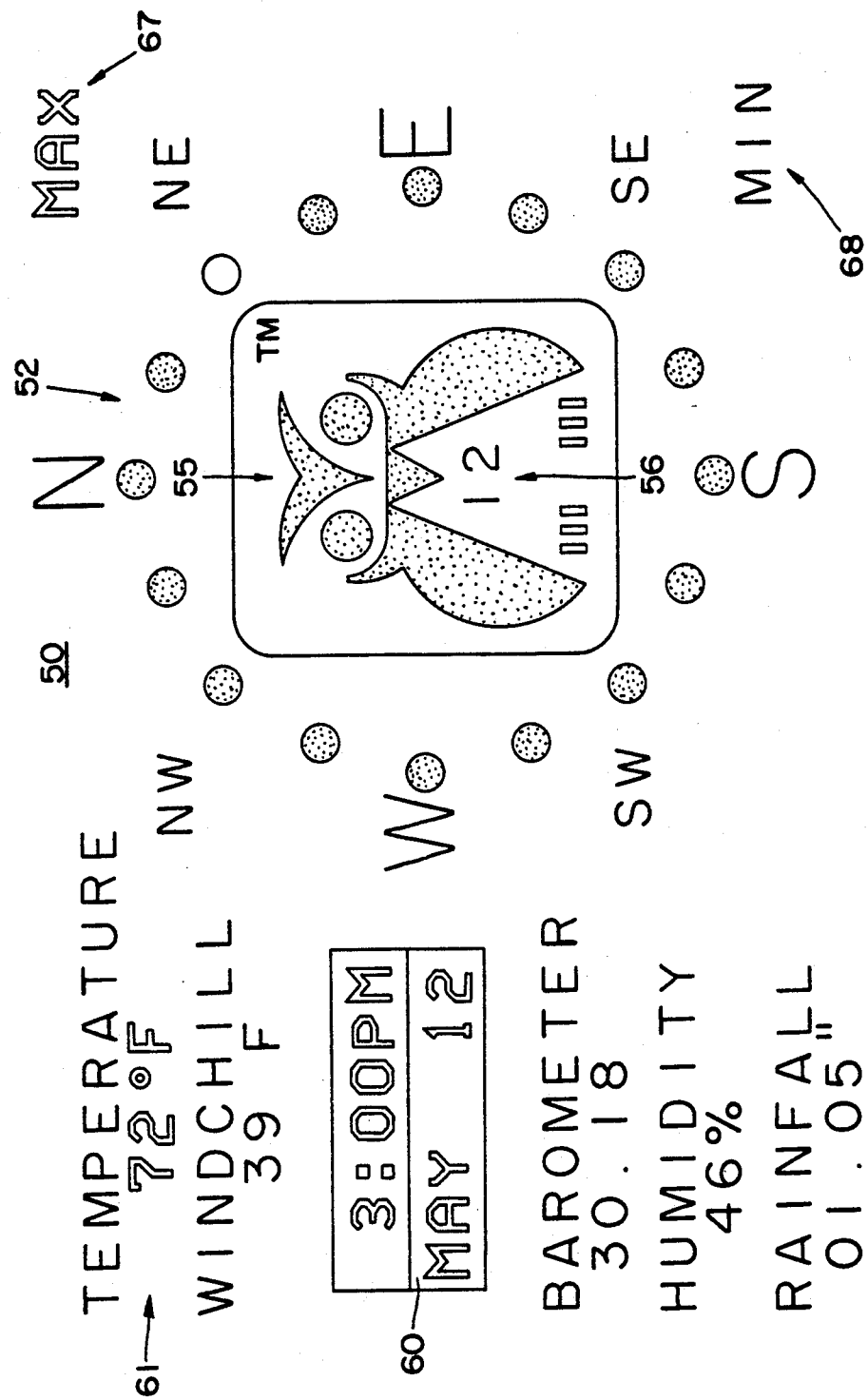
FIG. 3 is a diagrammatic view of the main screen display format in the interactive mode displaying the maximum measured value for a selected weather parameter along with the time and date of occurrence of the maximum measurement value.

A further diagrammatic view of the main screen display format during an interactive mode of the main screen display format is illustrated in FIG. 3. In the user interactive mode for the main screen display format, the user interrogates by light pen sensing of either the maximum or minimum interrogation locations 67 and 68. In this example the user has selected the maximum character location 67 which is then differentiated by lighting, by a higher level of illumination or by color change. In the example of FIG. 3 selection of the maximum interrogation character location 67 is indicated by the double outlining of the illuminated or lighted characters. The user then selects by light pen sensing one of the weather parameter character locations such as the temperature character location 61 as indicated in FIG. 3. The maximum measurement value of temperature measured since the last resetting of the maximum temperature memory is then displayed and similarly differentiated or offset by illumination or color. In this example the maximum measurement value is indicated by the double outlining of the maximum measurement value. At the same time the time and date of occurrence of the maximum measurement value is displayed in the time and date character location box 60.

A minimum measurement value where applicable may be similarly be recalled by light pen interrogation of the minimum interrogation character location 68 followed by light pen sensing of the selected weather parameter character location. At the same time that the minimum measurement value measured during the time interval since last resetting the minimum weather parameter memory is displayed and highlighted along with the time and date of occurrence of the minimum measurement value.

Resetting of maximum and minimum measurement values stored in the respective maximum and minimum weather parameter memory locations of the microprocessor is accomplished during display of the selected maximum or minimum measurement value. To reset the memory location for the displayed maximum or minimum weather parameter measurement value, the time and date character location box 60 is touched or sensed with the light pen. Light pen sensing of the time and date character location box 60 promptly resets the respective maximum or minimum measurement value storage location for renewed accumulation and comparison of current measurement values and running storage of the latest maximum or minimum measurement value.

A further interactive user mode with respect to the main screen display format is the selection or calling up of the secondary screen display format set forth in Table 1 of the specification. The secondary screen display format is selected by light pen sensing of the top of the graphic symbol 55, that is the head of the RainWise Owl logo (TM). This is distinguished from light pen sensing or interrogation of the wind speed character location 56 which may be used in combination following light pen sensing of the maximum interrogation character location 67 for calling up and displaying the maximum measurement value of wind speed during the previous time interval since resetting.

Upon light pen sensing of the head of the graphic symbol 55 Table 1 appears on the display screen as the secondary screen display format. From the secondary screen display format the user may then assemble a user message for display at the top of the main screen display format by sequential light pen sensing of the desired alphanumeric characters, punctuation marks, and selected symbols along with control features along the bottom row for introducing a space, backspace or clear word processing function. Additional boxes at the top of the secondary screen display format permit light pen actuation for resetting the cumulative rainfall total of the main screen display format, resetting the time and date, and return to the main screen display screen.

Figure 4:
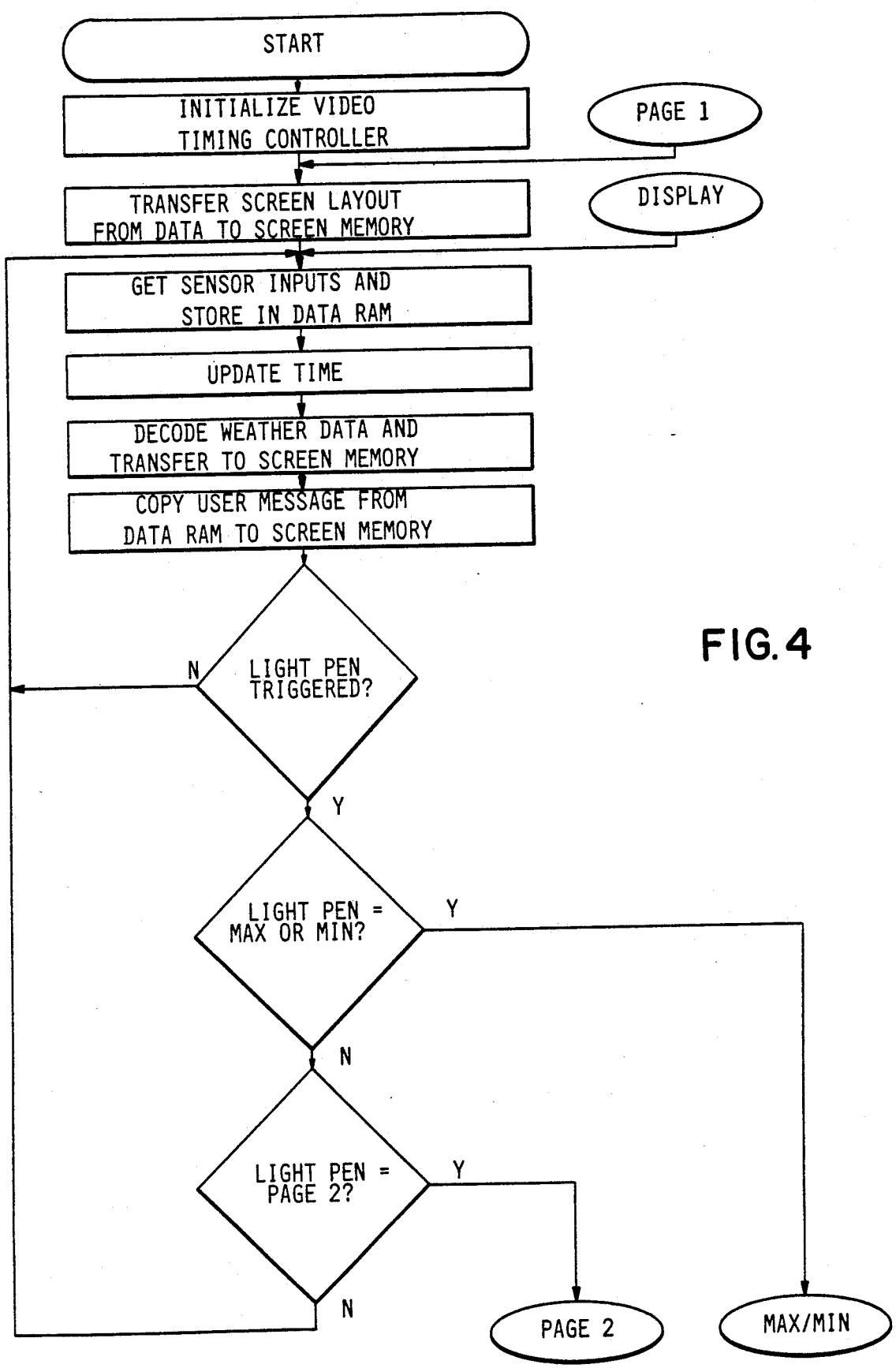
FIG. 4 is a flow chart of the first program component stored in program memory for initializing the screen display and updating stored weather data with current measurement values.

A flow chart setting forth the first program component stored in program memory for periodically updating weather parameter measurement data and for initializing the screen display is set forth in FIG. 4. Upon turning on the display system microprocessor, screen parameter data is loaded to the video timing controller or raster controller 24 and the screen display format data or screen layout data for the main screen display format is transferred from the program and screen data memory 22 to the bit map memory 25. The main screen display format is referred to as "PAGE 1" in the flow chart. Inputs from the weather parameter sensors are retrieved during each update time interval of, for example 4 seconds, and the processed weather data is stored in the data RAM of microprocessor 22. At each update time interval the current weather data is transferred from the microprocessor data RAM to the screen memory or bit map memory 25 for display on the main screen display format on a video screen. Any user message previously assembled from the alphanumeric characters of the secondary screen display format of "PAGE 2" is also transferred from the microprocessor data RAM to the bit map memory 25. The first program component set forth in FIG. 4 also determines whether the light pen has been triggered for initiating the second program component for recalling maximum or minimum measurement value data or for initiating the third program component for interrogating the secondary screen display format or "PAGE 2" screen format.

Figure 5A:
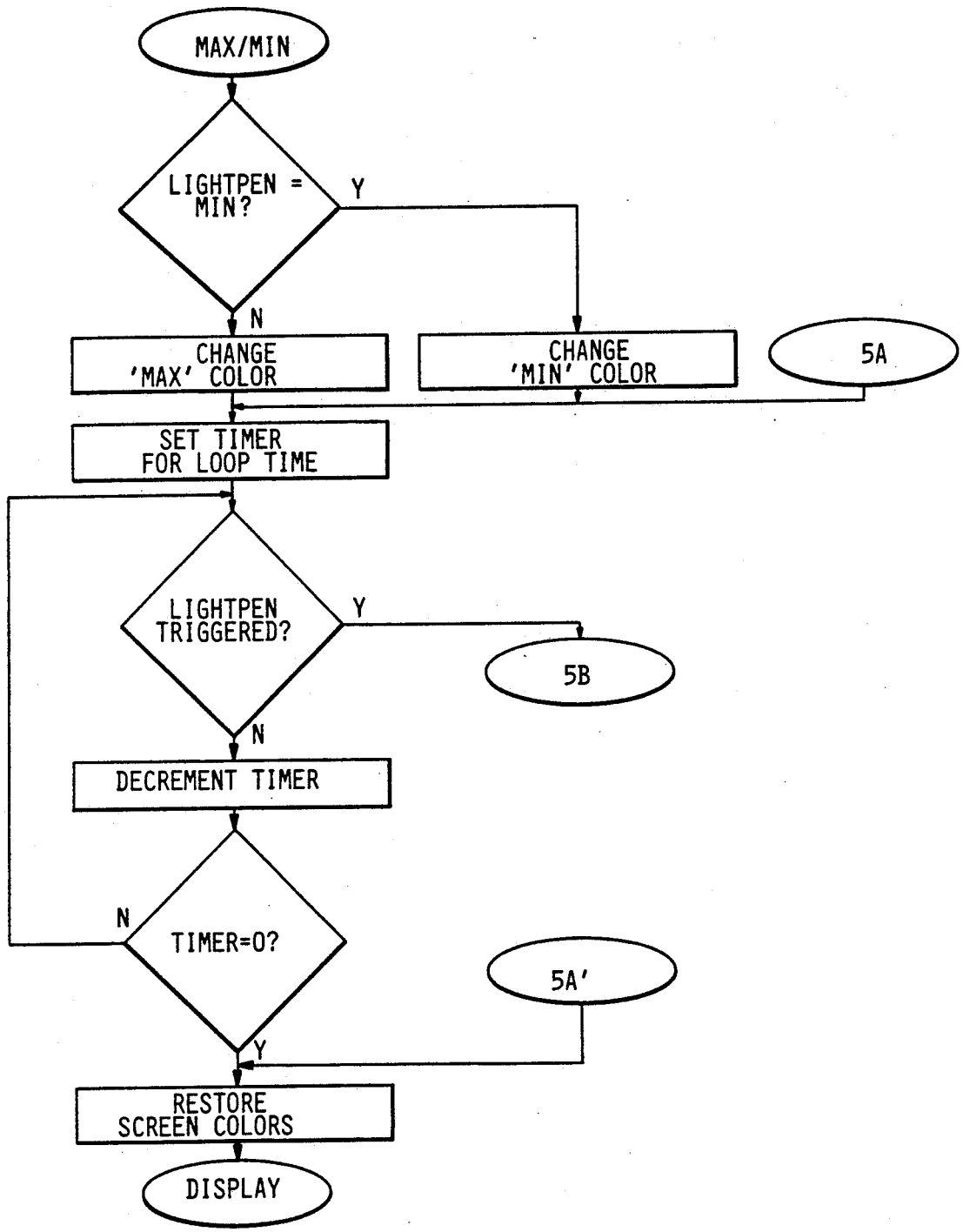
FIGS. 5A, 5B and 5C are flow charts of the second program component, the main screen interactive program component, stored in program memory for user interaction with the main screen display format for selecting and displaying maximum or minimum measurement values for selected weather parameters and for resetting or modifying the weather data for selected weather parameters.
Figure 5B:
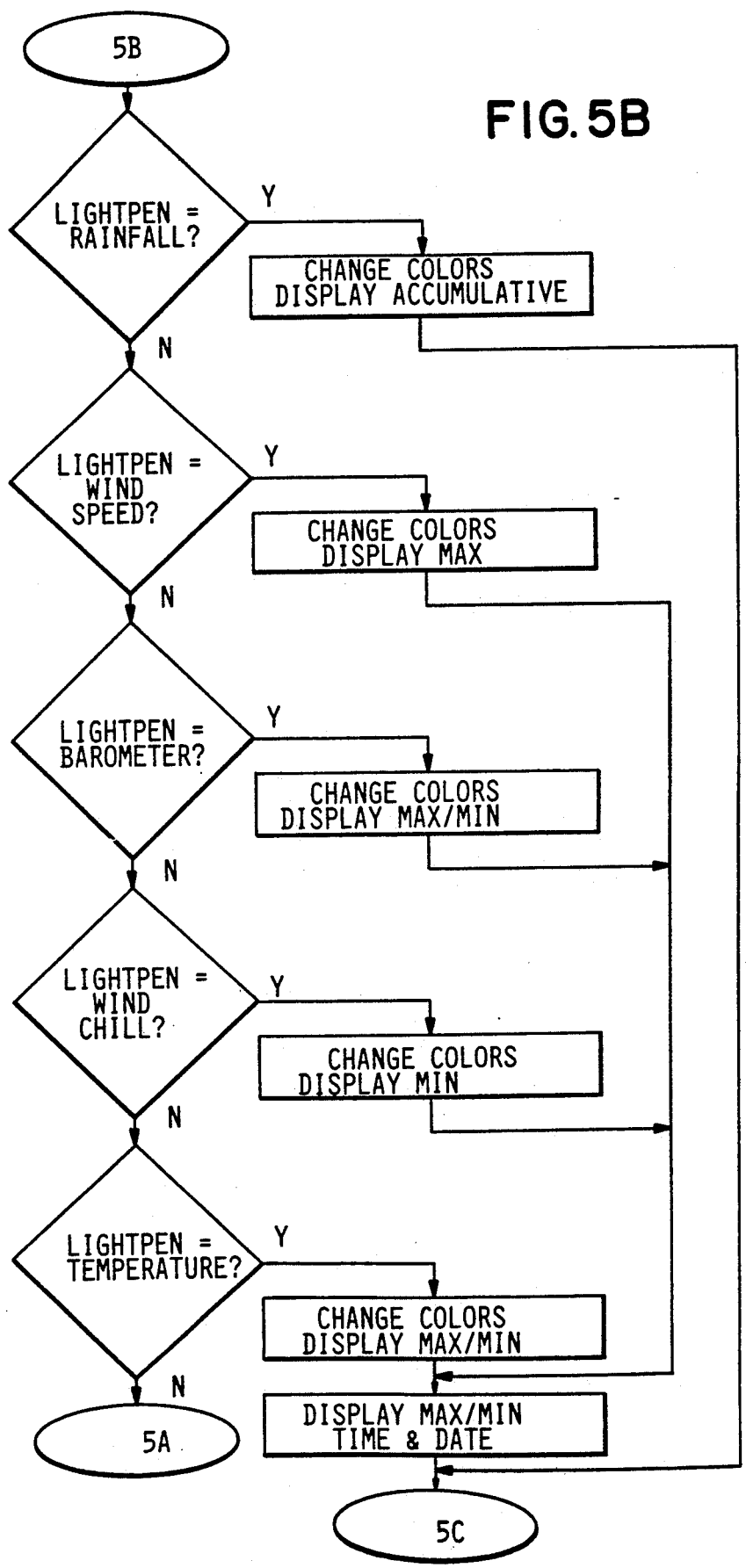
Figure 5C:
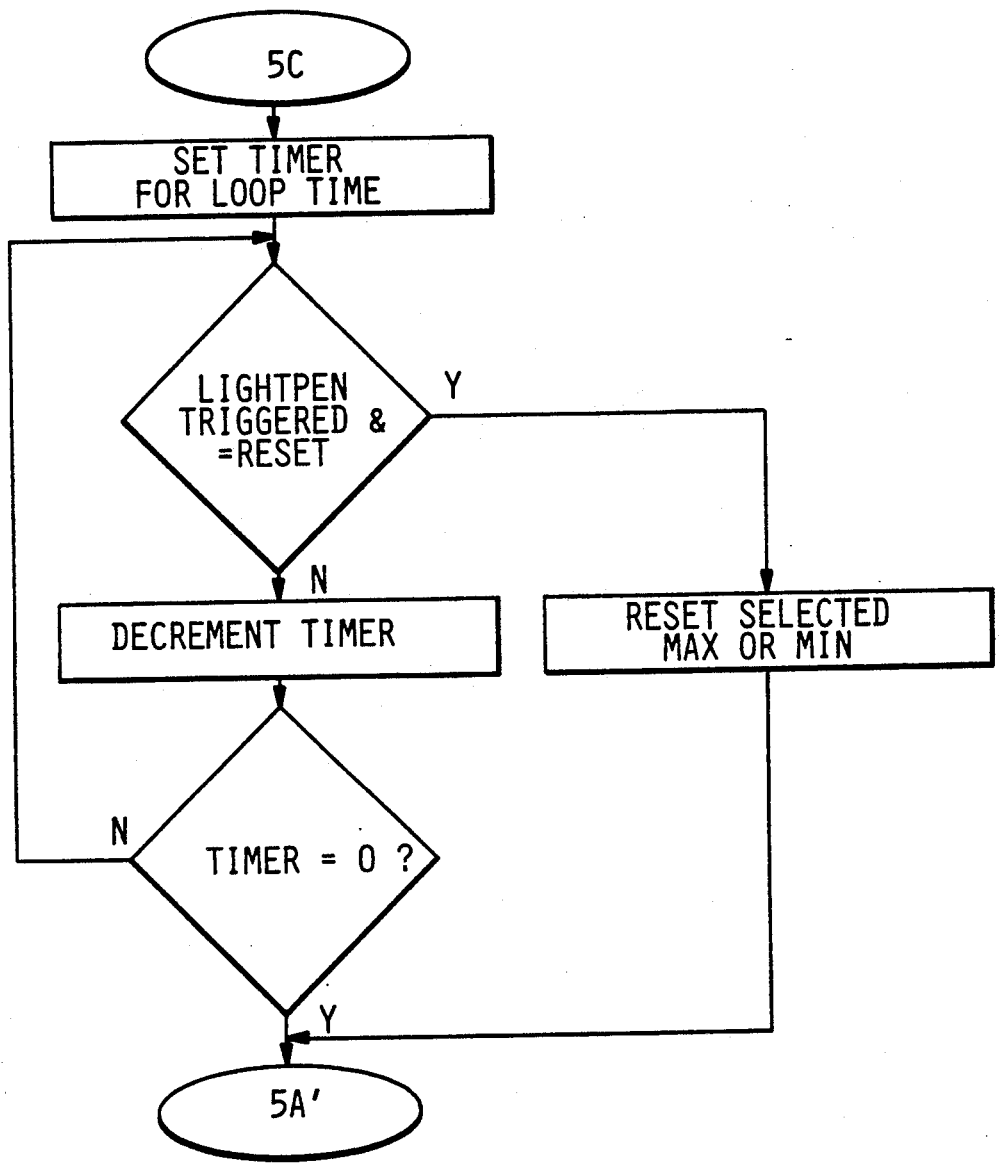

A flow chart setting forth the second program component for interactive recall and resetting of maximum and minimum measurement value weather data is illustrated in FIGS. 5A, 5B and 5C. As shown in FIG. 5A the second program component causes the microprocessor to respond to light pen interrogation of either the maximum or minimum interrogation location with a color change followed by a timed interval during which a weather parameter is selected by the light pen or the characters return to the original main screen display format character color. As set forth in FIG. 5B the second program component causes the microprocessor to respond to the selected weather parameter by recall and display from the microprocessor data RAM of the selected maximum or minimum measurement value.

Finally, as set forth in FIG. 5C the second program component permits initiation of reset of selected weather parameter maximum or minimum measurement value by triggering the light pen at the reset location. The reset location for resetting a displayed weather parameter maximum or minimum measurement value is the time and date character location box 60. A time interval is also established during which user reset must occur or the original data is retained.

Figure 6A:
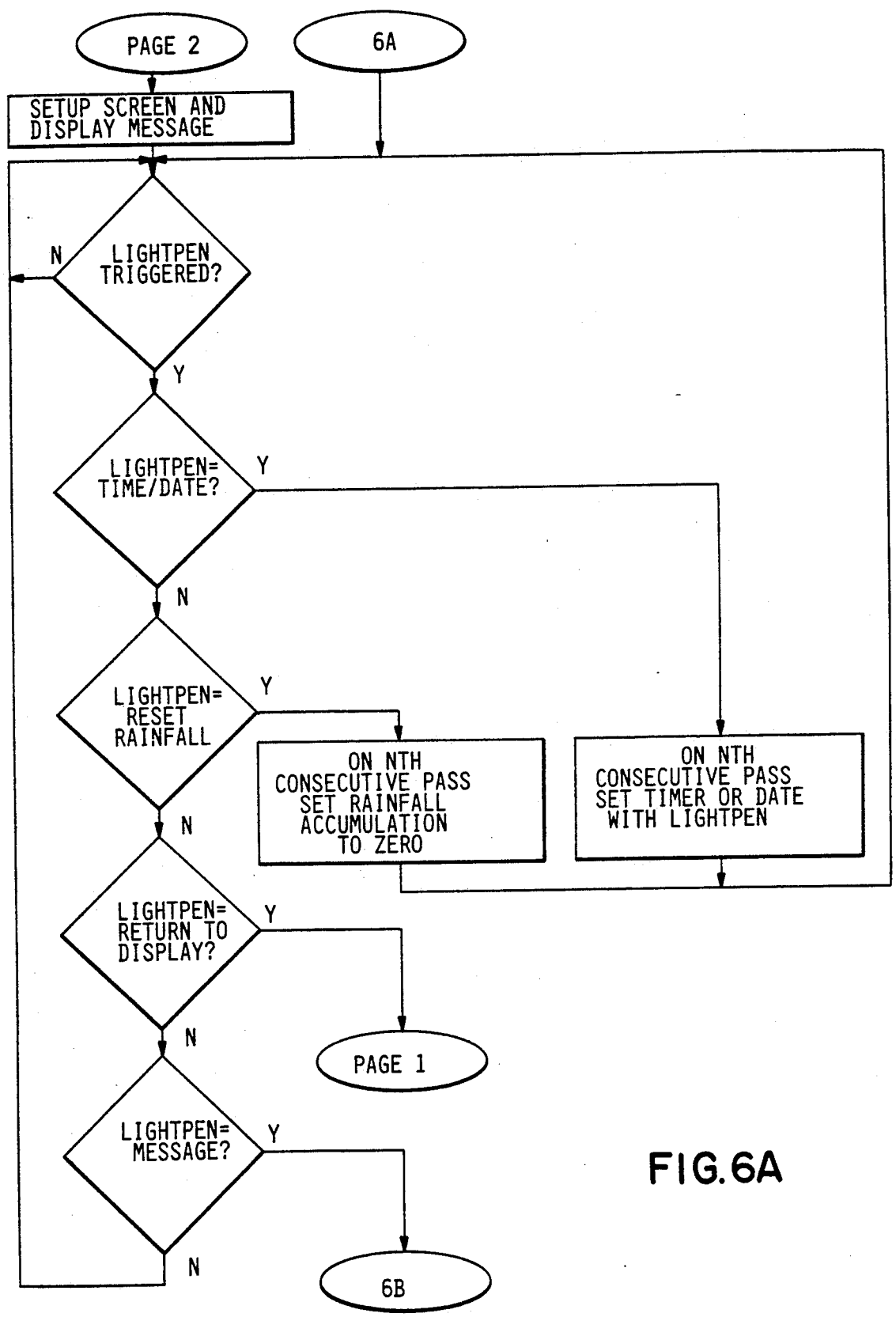
FIGS. 6A and 6B are flow charts of the third program component, the secondary screen interactive program component, for user interaction with the secondary screen display format for assembling user messages on the main screen display format and for resetting or modifying weather data for other selected weather parameters.
Figure 6B:
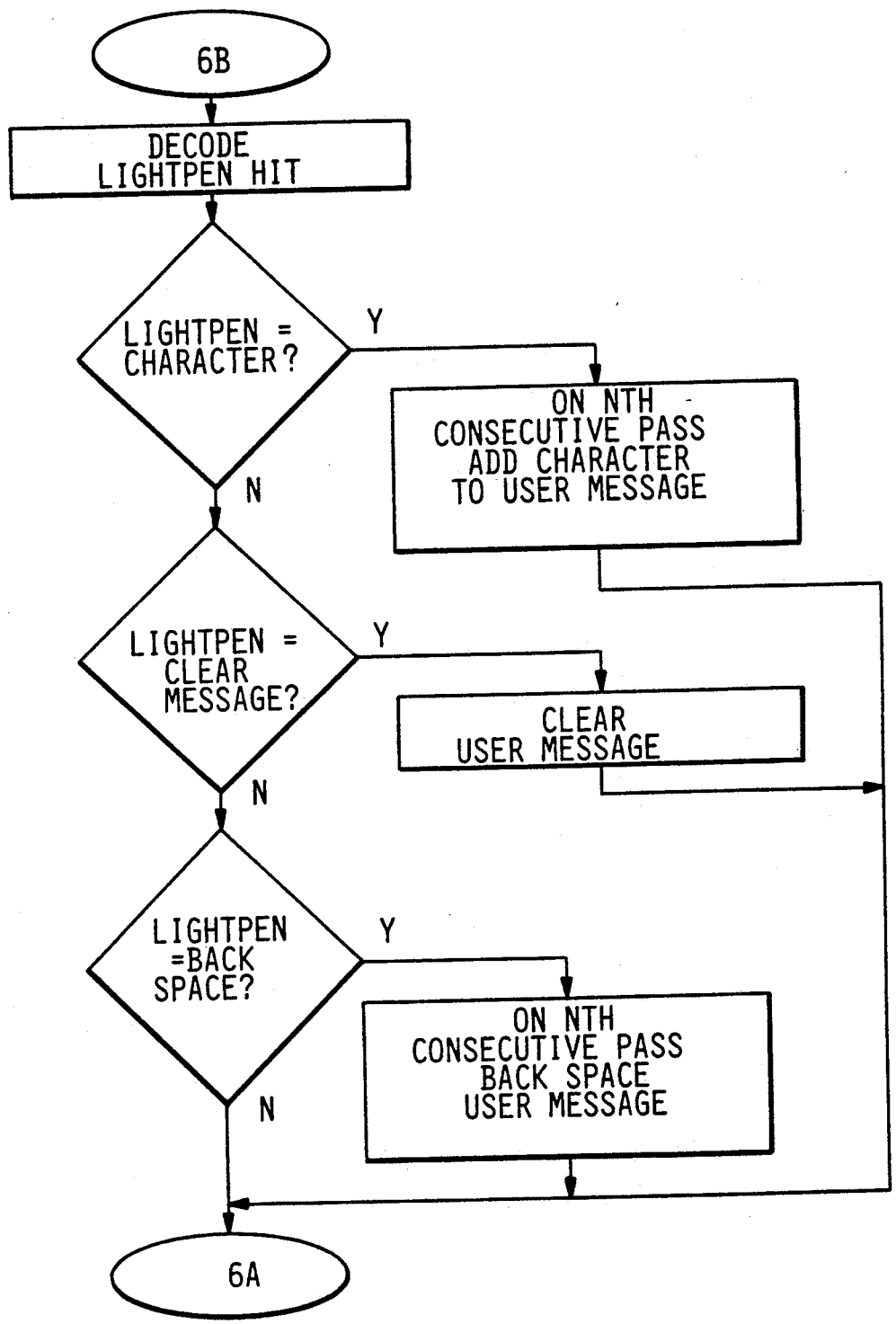

A flow chart of the third program component stored in program memory 22 for user interaction with the secondary screen display format identified as "PAGE 2" is illustrated in FIGS. 6A and 6B. The secondary screen display format is illustrated or set forth in TABLE 1 in the specification. The PAGE 2 secondary screen display format and corresponding third program component permit user resetting of the time and date displayed on the main screen display format by placing the light pen at the designated character locations for TIME and DATE to advance the respective numbers as identified in TABLE 1. Rainfall accumulation is reset by light pen sensing of the "RESET RAINFALL TOTAL" box. The light pen user may also elect to assemble a user message for display on the main screen display format by assembling alphanumeric characters as set forth in the continuation of the third program component in FIG. 6B. The interactive assembly of a user message includes several word processing type controls available by light pen selection from the locations indicated on TABLE 1. The word processing type steps including adding characters, clearing characters and backspace. Return to the PAGE 1 main screen display is actuated by light pen sensing of the "RETURN TO MAIN DISPLAY" box.

A block diagram of the system clock 46 which provides all the necessary timing signals for the weather station interactive display system is illustrated in FIG. 7.

While the invention has been described with reference to particular example embodiments it is intended to cover all modifications and equivalents within the scope of the following claims.

TABLE 1

| 23:26 (TIME) 05-16 (DATE) | | | RESET RAINFALL TOTAL | | | RETURN TO MAIN DISPLAY | | |
|---|---|---|---|---|---|---|---|---|
| A | B | C | D | E | F | G | H | I |
| J | K | L | M | N | O | P | Q | R |
| S | T | U | V | W | X | Y | Z | 0 |
| 1 | 2 | 3 | 4 | 5 | 6 | 7 | 8 | 9 |
| , | % | : | . | - | & | ↑ | ↓ | + |
| SPACE | | | | | BS | | | CLR |

Appendix
U.S. Pat. application Ser. No.
WEATHERSTATION DISPLAY SYSTEM
Applicants: Daniel J. LaPointe et. al.
Filing date: November 7, 1988
Assignee: RainWise Inc.
Express Mail #B10449084W
Hexadecimal Code Listing For Weatherstation Display System
Programs FIGS. 4-6 (For Intel 8039 uP)

```
:100000000000B818B0F1231034980000B840B000D8
:1000100099FBB8F123009090233E90B8F0233C90D8
:10002000230E90230090236890231B90231F90237E
:100030004790230790230090909008BF2230090B847
:10004000F390B8F1239F90236190232F9023289061
:100050002341908904B900BA08BBF4146A148C993E
:10006000FBB8F1232D9089044400BD01BE0014E8C3
:1000700023003498FA3C81A8230F3CF814B819F9EE
:1000800096701AFA6B96702310349883BD00BE00E8
:1000900014E8B900BA0C23003498FA3C81A8230F65
:1000A0003CF814D00019F996961AFA03F0969623A4
:1000B000103498B817800083A823103498F8B8EF1C
:1000C0009099FBB8F123AB908904B810E8CC830079
:1000D000A823183498F8B8DF9099FBB8F123AB90B7
:1000E0008904B810E8E4830099FBB8F4FD9018FE89
:1000F00090890483A823103498F8B8EF9099FBB83E
:10010000F123AA908904B810E80883F0F21024249F
:100110005370F382F3450FC964DF8ACFB964DBC2F56
:10012000F8AB244DB8283717537F24140000000083
:1001300099FBB8F4FD90B8F5FE908904FC14B80062
:10014000000000FB14B800000000FA14B88300009F
:100150000AFBA00BB00C670039CC662E665971BAFD2
:1001600002457182470270366FF1A072A572A96690B
:10017000B67E00FBACFA47530FABFA530FAAA8300CD
:1001800099FBB8F4FD90B8F5FE908904FB14B80013
:100190000000000FA14B883000099EF908910830000E2
:1001A00023003CB840F0AAC6B7BD42BE0014E8B96F
:1001B00041F11914B8EAB1230F3C8300000000009C
:1001C000273CB840F0C6DFAABD02BE0114E8B94121
:1001D000CAFAC6DCF11914B8EAD40000F114F42309
:1001E0000F3C99FBB8F123319089048314E8FB0399
:1001F0003614B8FA033614B88300000000000007B
:100200004500B81DBDE4BE00340B3430B832BD44E7
:10021000BE01340B3430B819F03450BDA6BE0134E1
:10022000ECB91A5448B825B924F4BBB91554D1B95E
:100230003654E6B82E740C742034A0F5B470B4A40F
:100240004AC8000000000000BDA8BE0114E8F153DE
:100250001F03F4E65903F4E65D230A445F231914EF
:10026000B8F1531F03F4C66AF66BF1531FB8F934A3
:1002700014BDA334ECBDE3BE0114E819F147530FDC
:10028000AD6D6D03A6ADA314B81DFDA314B81DFD7F
:100290000A314B8F1530FE7AAC9F1F29F2744A12391
:1002A00014A3450BDE734EC83130A170F0E0B16C6
:1002B0000A1B0A191B160A22131E17131E150A1EE3
:1002C000101C0E19180C1D17181F0D0E0C00000025
:1002D000000000F1039CF6DBF144DD23633450BDE4
:1002E000C4BE02348083000000F147530FABF153CA
:1002F0000FAABD23BE033480232714B81900F14789
:100300000530F14B8BB37F1530F14B883F0B82F3423
:10031000014BD13BE023480830000000000000002
:10032000B82DB917F00352A3A0371761C650BA0809
:10033000F1610377A1A3AEF117A3AD74A6BA20B8FB
:100340002DF0600377A1A3AEF117A3ADF0A174A6C1
:10035000830000100101020203030404040506E2
:1003600006070708080890A0A0A0B0B0C0C0C0DF4
:100370000D0E0E0F0F101000D700F40116017701BB
:10038000B702170276029402B20290026E020D01C9
:10039000AD016D010E00F000D20000000000000071
:1003A000000000000000014E8FA14D0FA14D0FD0395
```

-continued

Appendix
U.S. Pat. application Ser. No.
WEATHERSTATION DISPLAY SYSTEM
Applicants: Daniel J. LaPointe et. al.
Filing date: November 7, 1988
Assignee: RainWise Inc.
Express Mail #B10449084W
Hexadecimal Code Listing For Weatherstation Display System
Programs FIGS. 4-6 (For Intel 8039 uP)

:1003B00020AD277EAE14E8FA14D0FA14D0830000E2
:1003C000BA0814E8233814D0EAC4BDA2BE0114E868
:1003D000BA07233814D0EAD2BDE2BE0114E8BA0746
:1003E000233814D0EAE083000000000000000000081
:1003F0002FC5E5832F00E5832FC5F5832F00F583F7
:10040000BD00BE10F55470E5F400FC1213ED04EECF
:1004100004A4BFFB03EFF6440309F604FA03E7F66E
:10042000720302F6040301F6040302F6040301F664
:100430008A0308F6040301F6E00302F6040301F65A
:10044000FF840400FB03EBF604FA03EEF604030456
:10045000E604FC373204B816B040BD12BE0214E800
:10046000233814D0233814D074CAB82F740CB93080
:10047000A43403FEF604FC373204B816B022BD22C1
:10048000BE0374C0B93854E6A44003FEF604BD624E
:10049000BE0274C0FC32B6B816B010B829B924F147
:1004A00052A6F4BE84A8F4CAB92ABE02BD6814E8F4
:1004B000232F14B8A434B816B012B826B924F132D8
:1004C000C5F4BE84C7F4CAB927BE02BD6814E823C8
:1004D0002F14B8A43400000000000000000000049
:1004E00003FEF604FC3204B816B008BD43BE017426
:1004F000C0B833BD44BE01340B3430B934A4340326
:10050000FEF630BDE3BE0074C0FC321EB816B00467
:10051000B821BDE4BE00340B3430B922A434B8167F
:10052000B006B81EBDE4BE00340B3430B91FA4348D
:100530008404000054480BDA6BE01BA36BB363480E0
:10054000BD80BE01F55470E5F400FC1253ED44EE9D
:1005500044A4BFFA03F1F6440301E644FB03F8F6B2
:100560004400304E644B816F052767284928AB2A428
:10057000D2ADF2B3A444327EB821B0FFA4BFB81EFE
:10058000B000A4BFB833B0FFA4BF3298B829B0FF01
:10059000B824F04304A0A4BFB826B000B824F05398
:1005A000FDA0A4BFB836B00018B000A4BFB82FB0EB
:1005B000000A4BF32BBB83DB063A4BFB83AB00014CA
:1005C0008C27624400000000000000099FBB8F195
:1005D0002328908904B900BA04BBF8146ABD00BE90
:1005E0000014E8B900BA04233814D0E9E7EAE700B8
:1005F00000F594F0E599FBB8F1233F90B90434C0ED
:10060000F55470E5BC00F400FC371200FB03021C3B
:1006100003FDF60FFA03E5F6000301F67B0302F68D
:100620000003011F6760302F6000301F6710302F6F9
:100630000003011F6640302F6000301F65F0302F60D
:100640000003011F65A0304F6000304F64FC400FB4E
:100650003EDF6E40308F6F1C4FAFC0307C4A2FCB8
:10066000310C4A2FC0319ACD324966EBC36FCC4A0
:10067000A2FC0334C4A2FC0321C4A2FB03E4F600E1
:1006800000305F69A0305F6000303F69E0305F6003C
:100690000003309F696C400232FC4A2230C4A223139
:1006A000C4A2AB23003CFBDFC6D2FB03CFC6DA17E4
:1006B000C6CCB840F003E6F6C7F017A00340A9FB8C
:1006C000A1FBAF34C0BDE0230F3CC400B84027A05D
:1006D000C4C11DFDC6AAC4C70000B840F007A017DA
:1006E000C6CCC4C1276299FBB8F1233890890404B1
:1006F00055B8382300A018A0C400F58400000000FD
:10070000FC53FEACB81CB00099FBB8F1232390BA9F
:10071000B908EA13E913232290803071228B8F6AB
:1007200080A9375BC636F9ABB81CF0030400A037CC
:10073000530CC665E408B81C10F0375303C641E4F7
:10074000B8F780ABF903FAA9F64CCBBA00F90365
:10075000E01AF64FA9FB03FFABF64EF90320ABFC02
:100760004301AC890483000000000BC00F400D9
:10077000FC37127DFB03E8F67F030AF6AE4400FA6D
:100780003E7F69B0313F67D2303ACBD98BE00146C
:10079000E8BE03233814D0EE9384002301ACBD18C7
:1007A000BE0314E8BE03233814D0EEA68400FA0377
:1007B000EBF67D030DF6B94400A4CCF112CAF09516
:1007C000345085FB032757ABE4DB0000F095345031
:1007D00085FA035557AAFB132957ABFA530FACFA06
:1007E0004753F0FAFFB530FAAFB47530FABBD63BE7D
:1007F000023480FFABFCAABD663480F5B4A4E58367
:10080000744709B824F20D23BF50A02466F0D20B20
:100810004340A00000000000000000000000B5
:10082000000000000000000000000000000000C8
:100830002310B81D14DCA00000B91E14B9C645323F

-continued

Appendix
U.S. Pat. application Ser. No.
WEATHERSTATION DISPLAY SYSTEM
Applicants: Daniel J. LaPointe et. al.
Filing date: November 7, 1988
Assignee: RainWise Inc.
Express Mail #B10449084W
Hexadecimal Code Listing For Weatherstation Display System
Programs FIGS. 4-6 (For Intel 8039 uP)

:10084000457400044FB92114B9C64F124F7406B84D
:10085000024B925231214DCA137C661F053FEA0048D
:10086000075231314DC03EDE66C00046E2300A10075
:100870000F04301A0F0530114CCAAF05310B96367
:1008800014CCABDAC6A4FB030237176AE6A8BC9FF8
:1008900018F0A1B92CFCA1C8F053EFA05301C6A4D5
:1008A000231040A0B9252400FA030237176BE6A4F1
:1008B000BC5F0490000000000000F0D196C02783C8
:1008C000F03761E6C92302830023018397C6D0A7CE
:1008D000F167830000000000000000099EF90899C
:1008E0001099FD9036E4808902830000000000002A
:1008F00000000000000000000000000000B001243FE4
:10090000F0AD18193213120E14B9C6153215C87489
:1009100020242B1208FDB9295227122B14B9C62BFB
:10092000122BC87432242B121C242223314B8151441
:10093000DC03C9E6D877537FA0039EE63FB062B8D8
:100940001810F09666B0F11810F003C49656A07413
:10095000080000000000B82CF0C666533F07C6D4E4
:10096000AAF053C06AA009B824D271237F50A024F2
:10097000C8F0F2C84380A06542A9AEBA4074EE6EDA
:10098000B82EB92FA014B912CC27624500B91DF1B9
:10099000F294249A3703DBF1E6BF03803717035B39
:1009A000AAB92EF19703D9F6AEF103DA24B023FFEA
:1009B000A3A974EE6A3717035BE6BD647C537FB866
:1009C00032A0B93314B932D0540064E074412489A0
:1009D000740C24C8B000246604FC01010105101742
:1009E0002029323B4248575E6163696C7073787AA4
:1009F0007D8185888B8D90929497999B9D9EA0A0D8
:100A0000F59AEFBB00BC080A9ADF00008A6097D213
:100A10001344414A7FB67ABEC079ADF00008A200A97
:100A200097D2254426A7BC24B82DFBE63003FFABA4
:100A3000FC0341A3DBC63BEC30BC00FCB82DA08A14
:100A40001083F5F6F7F3FB7B7A787C3CBCBBBD9D4D
:100A5000DDDEDFCFEF6F6E667636B6B2BA9ADAD8E1
:100A6000DCCCECEBEDE5000000000000000035
:100A700009B824F27A23BF50A083F0D2794340A072
:100A8000B81810F09679B0F11810F003C49679A058
:100A900074808300000000000000000000000DF
:100AA0000000000000000000000000000000046
:100AB00000000000000000000000000000000036
:100AC00000000000000000000000000000000026
:100AD00000000000000000000000000000000016
:100AE00000000000000000000000000000000006
:100AF00000000000000000000000000000000F6
:100B0000B91EB81D6410B921B81D6410B832B933CC
:100B1000F0A1B81A19F0A11819F0A1830000000083
:100B2000B824B926F0122B53FD642D4302A018649B
:100B30001000B824B929F0123D53FB642D4304641E
:100B40002DB82EB92F64102311B860B96114DCA040
:100B50000370360F021F65883370360E65E83B839C7
:100B6000B937F0030157A0C8277057A0F103015708
:100B7000A1C9277157A183000000000438024BF52
:100B80001810F0531FA9F0F718F0530FE7E690176D
:100B9000ADF047530FAEF903E7A596B1B5B9011D06
:100BA000FE03C3A36D96B1BD011EFE03F396B1BE55
:100BB00001FE47AEFD9767ADC8F9E6BE0380A0FD14
:100BC0006E18A083E0E3E0E1E0E1E0E0E1E0E1E0F5
:100BD000000000000000000000000000000015
:100BE0000000C753E8D7E5E46C0000000000BB0834
:100BF000279767296729E6FE96AEBF267296729834E
:100C000BA38B440BD20BE015470E5F400F5FC12C2
:100C10001CED08EE08BA30B440E5A4FEFA03F9F67C
:100C20004030F1F6420301F6040301F62F8404FBDA
:100C30003F7F6040302F6780301F6040302F656FE
:100C400040408404FB03F7F6040302F6C00301F6040371
:100C5000002F698840400B814F0125DB0011FFFC6BC
:100C60000638404B81AF017A0531F03E7E674F05327
:100C7000804301A094F08404B814F03281B00200E3
:100C80000001FFFC6878404B819F017A003C4E692BA
:100C9000B00094F084040000B814F052A1B0040035
:100CA0000001FFFC6A78404B81BF0471747A053F0E6
:100CB0000330E6BAF0530F4310A094F08404000010
:100CC0000B814F072C9B00800001FFFC6CF8404B882

-continued

| Appendix |
|---|
| U.S. Pat. application Ser. No. |
| WEATHERSTATION DISPLAY SYSTEM |
| Applicants: Daniel J. LaPointe et. al. |
| Filing date: November 7, 1988 |
| Assignee: RainWise Inc. |
| Express Mail #B10449084W |
| Hexadecimal Code Listing For Weatherstation Display System |
| Programs FIGS. 4-6 (For Intel 8039 uP) |

```
:100CD0001AB91BF0F2E3F00380A0E6DFF117A1944C
:100CE000F08404F1530F03F1E6D6F153F0A184DF51
:100CF000B81AF0531FE53450BD65BE003480B919F1
:100D0000F13450BD68BE003480B91BF147530F3435
:100D100050BDA5BE003480F5F1530FE7ADB81AF011
:100D2000F22527A42723016DE53450BDA8BE003469
:100D300080F5BFF8830000000000000000000004
:100D4000BC05BD65BE00E514E8E500FA14D0F5EC7D
:100D50004900BC05BDA5BE00E514E8E500FA14D0C5
:100D6000F5EC5B99FBB8F12330908048300000017
:100D7000B824B925F01291F10338F691BD62BE0294
:100D8000E514E8F5B9052350E514D0F5E986F5A496
:100D9000A3BD62BE02E514E8F5B9052310E514D041
:100DA000F5E99B83BE02BD68E514E8F5B82CF0F2C6
:100DB000BAD2C1232FE514B8F583232AE514B8F578
:100DC00083232BE514B8F58309532096D204000041
:100DD0000000000095320C6DB5470A4D2BA00BB0054F3
:100DE00070EADFEBDF652762E50410000000000019
:100DF000000000000000000000000000000000F3
```

We claim:

1. A weather station display system comprising:
a plurality of local weather parameter sensors each comprising a transducer for measuring values of a weather parameter at the location of the weather station display system and generating electrical signals representative of the measurement values of the local weather parameter;
electrical converting means for converting electrical signals representative of weather parameter measurement values to digitally coded weather data for digital signal processing;
computer processor means for digital signal processing and storage of the digitally coded weather data;
screen memory means comprising a current screen memory for storing current screen display information including screen display format data and digitally coded weather data for raster scanning onto a raster screen display;
raster control means operatively coupled to the computer processor and screen memory means for controlling and timing scanning access to the screen memory for updating the screen memory and for refresh of a raster screen display;
program memory means comprising screen display format data, said program memory means being operatively coupled to the computer processor for loading screen display format data to the screen memory means and raster control means for initializing the screen display format, said screen display format data comprising at least a main screen display format establishing an arrangement of a plurality of weather parameter character locations for weather data to appear in the form of current weather parameter characters on a raster screen display;
a light pen operatively coupled to the raster control means and computer processor for interrogating character locations of the screen display format on a raster screen display for selectively modifying displayed characters;
first program means stored in the program memory means causing the computer processor to sample periodically the digitally coded weather data from the respective weather parameter sensors and to update the weather data stored in the screen memory means for display on a raster screen display;
and second program means stored in the program memory causing the computer processor to respond to light pen interrogation of character locations of the screen display format on a raster screen display for selectively modifying displayed characters;
said raster control means generating digital signals scanned from the screen memory means representing said screen display format data and digitally coded weather data and also generating television video timing signals;
digital to video analog convertor means for converting said digital signals scanned from the screen memory means and said video timing signals to a composite video analog signal;
video frequency modulator means for modulating the composite video signal on a standard television channel frequency carrier and providing television output signals for real time display of local weather data; and
a standard television set at the location of the weather station display system for real time display of said local weather data in the desired screen display format and means for coupling the television output signals to an input of said standard television set;
said main screen display format comprising a maximum measurement value interrogation location and a minimum measurement value interrogation locations;
said first program means causing the computer processor means to determine and store maximum and minimum measurement values of the weather parameters and the respective times of occurrence; and
said second program means stored in the program memory means causing the computer processor to respond to light pen interrogation of one of the maximum and minimum measurement value interrogation locations followed by light pen sensing of a selected weather parameter character location by displaying the respective maximum or minimum measurement value measured during a previous selected time interval using maximum and minimum weather parameter characters distinguishable from current weather parameter characters.

2. The weather station display system of claim 1 further comprising a character generator operatively coupled to the screen memory means for generating characters for incorporation in the screen display format according to current codes stored in the screen memory means for displaying the weather data.

3. The weather station display system of claim 2 wherein the screen display format data stored in the program memory means comprises screen parameter data including specification of the number of characters per line and number of rows and columns of characters for loading to the raster control means, said raster control means further controlling the scan rate of data from the screen memory for raster scanning on to a television raster screen display and further controlling timing of access to the screen memory means for updating and creating images.

4. The weather station display system of claim 1 wherein the weather parameter sensors comprise a temperature sensor, a barometric pressure sensor, and a wind direction sensor.

5. The weather station display system of claim 4 wherein the weather parameter sensors further comprise a humidity sensor, a rain fall sensor and a wind speed sensor.

6. The weather station display system of claim 5 wherein the temperature sensor, humidity sensor, and barometric pressure sensor comprise analog sensors generating electrical analog signals for input to the electrical signal processing means for converting the electrical analog signals representative of temperature, humidity and barometric pressure measurement values to digitally coded weather data.

7. The weather station display of claim 6 wherein the wind speed and wind direction sensors are digital sensors generating digitally coded electrical signals representative of the wind speed and wind direction measurement values.

8. The weather station display system of claim 1 wherein the program memory means screen display format data comprises a main screen display format including a compass rose for displaying wind direction weather data by indicating wind direction on the compass rose and wherein the main screen display format includes character locations inside the compass rose for displaying wind speed weather data.

9. The weather station display system of claim 8 wherein the main screen display format includes character locations for displaying temperature, barometric pressure and humidity weather data in the form of alphanumeric characters.

10. The weather station display system of claim 9 wherein the main screen display format further comprises character locations for displaying wind chill, rain fall and wind speed weather data in the form of alphanumeric characters.

11. The weather station display system of claim 10 wherein the main screen display format further comprises character locations for indicating time and date data in the form of alphanumeric characters.

12. The weather station display system of claim 1 wherein the program memory means screen display format data comprises a main screen display format with weather parameter character locations for displaying weather data in the form of alphanumeric characters.

13. The weather station display system of claim 1 wherein the second program means causes the computer processor to display the time and date of occurrence of the respective displayed maximum or minimum measurement value.

14. The weather station display system of claim 13 wherein the screen display format data stored in the program memory means comprises a secondary screen display format establishing an arrangement of alphanumeric characters for selection in sequence by the light pen to assemble messages, wherein the main screen display format includes a message character location for displaying a message of characters assembled by light pen from the secondary screen display format, said main screen display format also including a page selection location for selecting the secondary screen display format for display, and wherein the second program means stored in the program memory means causes the computer processor to respond to page selection by the light pen and to assemble messages of characters selected from the secondary screen display format by the light pen for display in the message character location of the main screen display format.

15. The weather station display system of claim 13 wherein the main screen display format comprises a reset location for selection by the light pen and wherein the second program means stored in the program memory means causes the computer processor to reset maximum or minimum measurement values to be displayed at selected weather character locations.

16. A weather station display system comprising:
a plurality of local weather parameter sensors each comprising a transducer for measuring values of a weather parameter at the location of the weather station display system and generating electrical signals representative of the measurement values of the local weather parameter;
electrical converting means for converting electrical signals representative of weather parameter measurement values to digitally coded weather data for digital signal processing;
computer processor means for digital signal processing and storage of the digitally coded weather data;
screen memory means comprising a current screen memory for storing current screen display information including screen display format data and digitally coded weather data for raster scanning onto a raster screen display;
raster control means operatively coupled to the computer processor and screen memory means for controlling and timing scanning access to the screen memory for updating the screen memory and for refresh of a raster screen display;
program memory means comprising screen display format data, said program memory means being operatively coupled to the computer processor for loading screen display format data to the screen memory means and raster control means for initializing the screen display format, said screen display format data comprising at least a main screen display format establishing an arrangement of a plurality of weather parameter character locations for weather data to appear in the form of current weather parameter characters on a raster screen display;
a light pen operatively coupled to the raster control means and computer processor for interrogating character locations of the screen display format on a raster screen display for selectively modifying displayed weather data;
first program means stored in the program memory means causing the computer processor to sample periodically the digitally coded weather data from the respective weather parameter sensors and to update the weather data stored in the screen memory means for display on a raster screen display;
said main screen display format including character locations for displaying temperature, barometric pressure, wind direction, and wind speed weather data in the form of alphanumeric characters, said main screen display format comprising a compass rose for displaying wind direction weather data by indication of wind direction on the compass rose and character locations inside the compass rose for displaying wind speed weather data, said main screen display format also including maximum and minimum measurement value interrogation locations;

second program means stored in the program memory causing the computer processor to respond to light pen interrogation of one of the maximum and minimum measurement value interrogation locations followed by light pen sensing of a selected weather parameter character location by displaying the respective maximum or minimum measurement value measured during a previous time interval using maximum and minimum weather parameter characters distinguishable from current weather parameter characters;

said computer processor comprising a system clock, said main screen display format including a time and date in the form of alphanumeric characters, said second program means causing the computer processor means to respond to light pen interrogation of one of the maximum and minimum measurement value interrogation locations followed by light pen sensing of a selected weather parameter character location by displaying the time and date of occurrence of a maximum or minimum measurement value of the selected weather parameter displayed on the main screen display format at the same time as displaying the respective maximum or minimum measurement values in said distinguishable characters.

17. The weather station display system of claim 16 wherein the screen display format data stored in the program memory means comprises a secondary screen display format establishing an arrangement of alphanumeric characters for selection in sequence by the light pen to assemble messages, wherein the main screen display format includes a character location for displaying a message of characters assembled by light pen from the secondary screen display format, said main screen display format also including a page selection location for selecting the secondary screen display format for display, and wherein the second program means stored in the program memory means causes the computer processor to respond to page selection by the light pen and to assemble messages of characters selected from the secondary screen display format by the light pen for display in the message character location of the main screen display format.

18. The weather display system of claim 17 wherein the main screen display format comprises a reset location for selection by the light pen and wherein the second program means stored in the program memory means causes the computer processor to reset maximum or minimum measurement values to be displayed at selected weather character locations.

19. The weather station display system of claim 16 comprising a character generator operatively coupled to the screen memory means for generating characters for incorporation in the screen display format according to current codes stored in the screen memory means for displaying the weather data.

20. The weather station display system of claim 16 further comprising a digital to video analog convertor for converting digital signals scanned from the screen memory means to a video analog signal, a video frequency modulator for modulating the video signal on a standard television channel frequency carrier, a standard television set, and coupling means coupling the modulated video signal to an input of the television set.

21. A weather station display system comprising:

a plurality of local weather parameter sensors each comprising a transducer for measuring values of a weather parameter at the location of the weather station display system and generating electrical signals representative of the measurement values of the local weather parameter; electrical converting means for converting electrical signals representative of weather parameter measurement values to digitally coded weather data for digital signal processing;

computer processor means for digital signal processing and storage of the digitally coded weather data;

screen memory means comprising a current screen memory for storing current screen display information including screen display format data and digitally coded weather data for raster scanning onto a raster screen display;

raster control means operatively coupled to the computer processor and screen memory means for controlling and timing scanning access to the screen memory for updating the screen memory and for refresh of a raster screen display;

program memory means comprising screen display format data, said program memory means being operatively coupled to the computer processor for loading screen display format data to the screen memory means and raster control means for initializing the screen display format, said screen display format data comprising a main screen display format establishing an arrangement of a plurality of weather parameter character locations for weather data to appear in the form of current weather parameter characters on a raster screen display, and a secondary screen display format establishing an arrangement of alphanumeric characters for selection in sequence by a light pen to assemble messages, said main screen display format including a message character location for displaying a message of characters assembled by light pen from the secondary screen display format, said main screen display format also including a page selection location for selecting the secondary screen display format for display, a light pen operatively coupled to the raster control means and computer processor for interrogating character locations of the screen display format on a raster screen display for selectively modifying displayed characters;

first program means stored in the program memory means causing the computer processor to sample periodically the digitally coded weather data from the respective weather parameter sensors and to update the weather data stored in the screen memory means for display on a raster screen display;

second program means stored in the program memory causing the computer processor to respond to light pen interrogation of character locations of the screen display format on a raster screen display for selectively modifying displayed characters, said second program means causing the computer processor to respond to page selection by the light pen and to assemble messages of characters selected from the secondary screen display format by the light pen for display in the message character location of the main screen display;

said main screen display format comprising a maximum measurement value interrogation location and a minimum measurement value interrogation locations;

said second program means stored in the program memory means causing the computer processor to respond to light pen interrogation of one of the maximum and minimum measurement value interrogation locations followed by light pen sensing of a selected weather parameter character location by displaying the respective maximum or minimum measurement value measured during a previous selected time interval using maximum and minimum weather parameter characters distinguishable from current weather parameter characters.

* * * * *